Dec. 1, 1936.                    R. LOOS                    2,062,894
                                ROPE CLAMP
                            Filed Jan. 3, 1936

INVENTOR
REINHOLD LOOS
BY
ATTORNEY

Patented Dec. 1, 1936

2,062,894

UNITED STATES PATENT OFFICE 2,062,894

ROPE CLAMP

Reinhold Loos, Newark, N. J.

Application January 3, 1936, Serial No. 57,344

5 Claims. (Cl. 24—134)

This invention relates to rope clamps of the type described in my Patent #1,958,969, granted May 15th, 1934.

It is an object of this invention to provide a new and improved rope clamp of the general type heretofore described which will have the advantages of the former rope clamp and which will be of wider application.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description, taken in connection with the accompanying drawing, in which.

Figure 1:
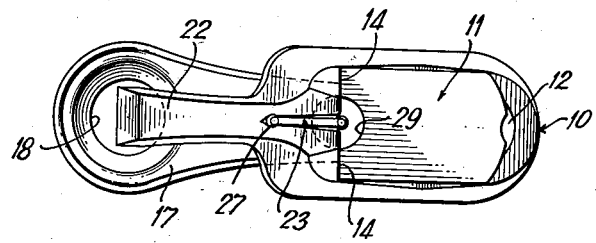
Figure 1 is a plan view of a clamp embodying this invention.
Figure 2:
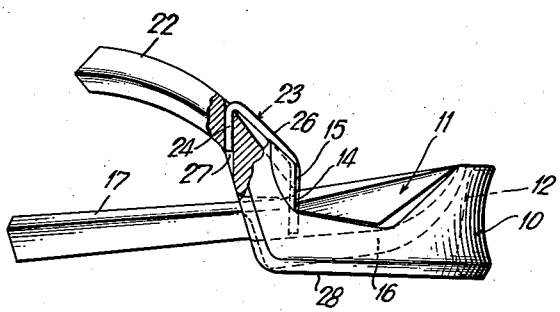
Figure 2 is a side elevation thereof partly in section.
Figure 3:
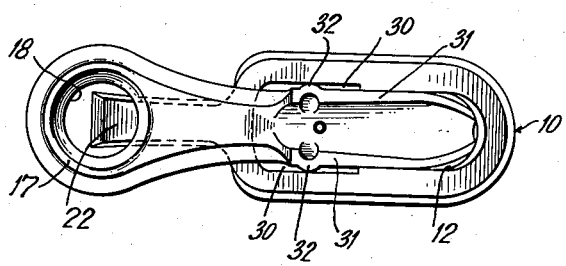
Figure 3 is a bottom plan view.

In the drawing, the numerals 10 and 11 represent male and female members respectively of the form generally described in the aforesaid patent, the member 10 being provided with a slot 12 to receive at its forward end a rope 13 and the member 11 has on each side near its upper face a lateral extension 14 fitting against a shoulder 15 upon the member 10 to serve as a pivot for the member 11 and the latter has at the under side of its forward end a groove 16 in position to bear against the rope 13 and to compress it against the forward end of the slot 12 when the member 11 is moved about its pivot.

The member 11 has a projecting handle 17 provided at its outer end with an eye 18 to receive the end of a rope 19 which may be attached to it by a knot 20 and in this manner when the free end 13a of the rope 13 is pulled, the rope slides freely through the throat formed by the slot 12 and the groove 16, but when the end 13a is released, the tension upon the taut end 13b of the rope causes the member 11 to press down upon the rope 13, clamping it in place. The member 10 is also provided with a curved upwardly projecting handle 22. This construction is substantial in accordance with the construction of the prior patent and need not be described in greater detail.

Figure 4:
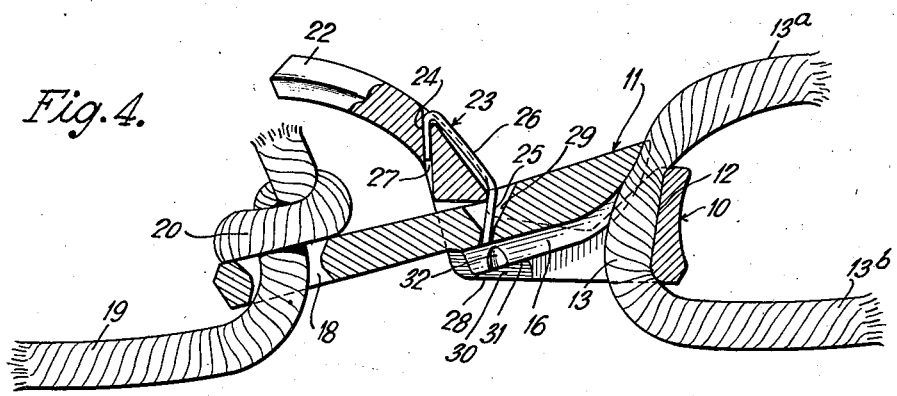
Figure 4 is a longitudinal vertical section thereof.

In accordance with this invention, I have provided spring means of a new and efficient character for holding the male member in engagement with the rope, which means as here illustrated, takes the form of a spring wire 23 comprising two substantially parallel or preferably converging legs 24 and 25, connected by an intermediate portion 26. When the legs are made convergent the spring action of the spring wire holds the spring in place. As shown the intermediate portion 26 is at an acute angle to the portion 24 and at an obtuse angle to the portions 25. A hole 27 is bored in the handle 18 of the female member 10 substantially perpendicular to the general plane of the base 28 of the said member. Within the male member there is provided a conical hole 29 so positioned that as the arm 24 of the spring 23 is shoved into the hole 27, the arm 25 of the spring will engage the side wall of the lower end of the opening 29 in the male member and exercise a spring pressure thereon to the left as shown in Figure 4.

It will be observed from the drawing that the projection 14 upon the male member is toward the upper side of the member, whereas the edge of the conical opening 29 is at the bottom side of the member and hence pressure to the left by the spring arm 25 exercises a turning moment upon the member 21 to bring it into engagement with the rope 13.

By reason of the foregoing construction, the rope is at all times held in position unless and until the arm 22 of the member 10 is definitely raised. This has the distinct advantage over the former construction in that a mere slackening in the tension of the rope will not cause the clamp completely to release.

Means are also provided for preventing an undue movement between the two members which might injure the spring 23. To accomplish this result, I provide lateral recesses 30, of limited depth, on each side of the rear end of the groove 12, and after the parts are assembled in place, I expand the edges 31 of the groove 16 in the male member outwardly as shown at 32 to hold the parts in place.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:—

1. A device of the character described comprising a female portion having a slot therein adapted to receive a rope and a clamping member, a clamping member pivoted within the said slot and having an extended arm with an eyelet therein and a spring for urging said clamping member to closed position comprising a pair of substantially parallel arms connected by an intermediate spring portion, one of said members having a hole snugly to receive one of said arms, and the other of said members having a conical opening terminating in a hole substantially the size of the other of said arms.

2. A device of the character described comprising in combination a female member having a slot through the body portion, said slot terminating in a stationary cylindrical surface at one end, said member having its upper surface cut away at a point adjacent to the other end of said slot to form a shoulder, a male member having an attachment means at one end, an enlargement at the other end defined by shoulders adapted to cooperate with the shoulders on the female member, a cam surface on said enlargement to cooperate with said cylindrical surface to grip the rope, and spring means for urging said male member to closed position and a stop upon said female member adapted to extend into the pathway of the male member and prevent disassembling of the parts.

3. A device of the character described comprising in combination a female member having a slot through the body portion, said slot terminating in a stationary cylindrical surface at one end, said member having its upper surface cut away at a point adjacent to the other end of said slot to form a shoulder, a male member having an attachment means at one end, an enlargement at the other end defined by shoulders adapted to cooperate with the shoulders on the female member, a cam surface on said enlargement to cooperate with said cylindrical surface to grip the rope, and spring means for urging said male member to closed position, comprising a substantially U shaped spring, a cylindrical recess in one of said members to receive one leg of said spring and a conical recess in the other of said members to cause said spring to hold said male member in clamping position.

4. A device of the character described comprising in combination a female member having a slot through the body portion, said slot terminating in a stationary cylindrical surface at one end, said member having its upper surface cut away at a point adjacent to the other end of said slot to form a shoulder, a male member having an attachment means at one end, an enlargement at the other end defined by shoulders adapted to cooperate with the shoulders on the female member, a cam surface on said enlargement to cooperate with said cylindrical surface to grip the rope, and spring means for urging said male member to closed position, comprising a substantially U shaped spring, a cylindrical recess in one of said members to receive one leg of said spring and a conical recess in the other of said members to receive the other leg of said spring, positioned to cause said spring to hold said male member in clamping position, and means for limiting the relative movement of said members.

5. A rope clamp comprising a member adapted slidingly to receive a rope, a clamp pivoted to said member and adapted to press said rope against said member and having connections for a rope end, said pivot being out of alignment with said ropes when the latter are under tension, whereby the tension of said ropes will press said clamp into clamping position and spring means for holding said clamp in engagement with the rope comprising a U shaped spring having its ends converging, fitting into deep recesses in said members respectively of substantially the same size as the spring, whereby the spring will be confined by the recesses and will be bent when the angle of said recesses relative to each other is changed.

REINHOLD LOOS.